United States Patent [19]

Campbell et al.

[11] Patent Number: 4,867,766
[45] Date of Patent: Sep. 19, 1989

[54] OXYGEN ENRICHED AIR SYSTEM

[75] Inventors: Michael J. Campbell, Clarence Center; James Smolarek, Boston; John J. Pietruszewski, Buffalo, all of N.Y.

[73] Assignee: Union Carbide Corporation, Danbury, Conn.

[21] Appl. No.: 242,605

[22] Filed: Sep. 12, 1988

[51] Int. Cl.$^4$ ............................................. B01D 53/04
[52] U.S. Cl. ........................................ 55/161; 55/179; 55/218; 55/270; 55/271; 55/389
[58] Field of Search ................... 55/18, 20, 21, 25, 26, 55/58, 62, 68, 74, 75, 160–163, 179, 180, 210, 218, 270, 271, 274, 387, 389

[56] References Cited

U.S. PATENT DOCUMENTS

| | | |
|---|---|---|
| 3,922,149 | 11/1975 | Ruder et al. ............................ 55/21 |
| 3,957,463 | 5/1976 | Drissel et al. ............................ 55/25 |
| 4,428,372 | 1/1984 | Beysel et al. .......................... 55/21 X |
| 4,449,990 | 5/1984 | Tedford, Jr. ............................... 55/26 |
| 4,552,571 | 11/1985 | Dechene ................................ 55/25 X |
| 4,685,939 | 8/1987 | Kratz et al. ............................... 55/25 |
| 4,690,696 | 9/1987 | Sircar et al. .............................. 55/26 |
| 4,732,579 | 3/1988 | Veltman et al. ...................... 55/26 X |
| 4,744,803 | 5/1988 | Knaebel ................................... 55/25 |
| 4,793,832 | 12/1988 | Veltman et al. ..................... 55/26 X |

FOREIGN PATENT DOCUMENTS 2003742 3/1979 United Kingdom ..................... 55/18

Primary Examiner—Robert Spitzer
Attorney, Agent, or Firm—Alvin H. Fritschler

[57] ABSTRACT

Enriched oxygen from a pressure swing adsorption system and air are blended to provide oxygen enriched air of desired purity, particularly for use at flow rates between those for which liquid oxygen and on-site cryogenic air separation plants are desirable.

21 Claims, 3 Drawing Sheets

OXYGEN ENRICHED AIR SYSTEM

BACKGROUND OF THE INVENTION

1. Field of the Invention

The invention relates to oxygen enriched air. More particularly, it relates to the production of oxygen enriched air by the use of a pressure swing adsorption and a related air blending control system.

2. Description of the Prior Art

There are numerous industrial applications in which oxygen enriched air is desirable for enhanced combustion purposes. In such applications, liquid oxygen is commonly shipped to an on-site liquid storage tank for blending with air to produce the desired purity level of oxygen enriched air. The liquid oxygen used for this purpose typically has an oxygen concentration of 99.5+%. If the requirements for oxygen enriched air at the job site are sufficient to warrant, a cryogenic air separation unit might be installed at the job site to reduce the overall costs associated with the production and supply of oxygen enriched air for such industrial applications.

An alternative for some applications involves the use of permeable membranes suitable for convenient air separation operations. Such membranes generally separate air into a high purity, non-permeate nitrogen stream and an oxygen enriched, permeate stream. Membrane systems are simple and generally only produce oxygen enriched air in the 30–40% purity range, without the necessity for air blending. For certain relatively low volume applications, the use of on site permeable membrane systems may be used to supply oxygen enriched air. Pressure swing adsorption (PSA) systems have also been utilized to produce oxygen enriched air.

A significant field of practical commercial operation remains, however, in which the shipment of liquid oxygen from a centrally located cryogenic air separation plant to a storage facility on site, for subsequent air blending, remains the most economical means for supplying the needs for oxygen enriched air at an industrial facility. Nevertheless, the overall costs associated with such production of oxygen enriched air from liquid oxygen are relatively high, significantly affecting the feasibility of employing oxygen enriched air to enhance the efficiency of combustion furnaces and to achieve power savings in the operation of such furnaces. It will also be appreciated that different combustion furnaces will require different purities of oxygen enriched air for most efficient operation. It is a desire in the art, therefore, that improvements be made in the production of oxygen enriched air for such combustion operations, particularly improvements enabling oxygen enriched air at desired purity levels to be produced and supplied at lower costs than is presently possible by the blending of liquid oxygen with air.

It is an object of the invention, therefore, to provide an improved system for the production of oxygen enriched air.

It is another object of the invention to provide an improved system for the on site production of oxygen enriched air not based on the shipment of liquid oxygen to the plant site.

With these and other objects in mind, the invention is hereinafter described in detail, the novel features thereof being particularly pointed out in the appended claims.

SUMMARY OF THE INVENTION

A pressure swing adsorption system and air blending means are controlled to provide oxygen enriched air of desired oxygen concentration. System flow and purity are monitored to enable the proper amount of air from air compressor means to be blended with the enriched oxygen from the pressure swing adsorption system.

BRIEF DESCRIPTION OF THE DRAWING

The invention is described with particular reference to the accompanying drawings in which.

DETAILED DESCRIPTION OF THE INVENTION

Figure 1:
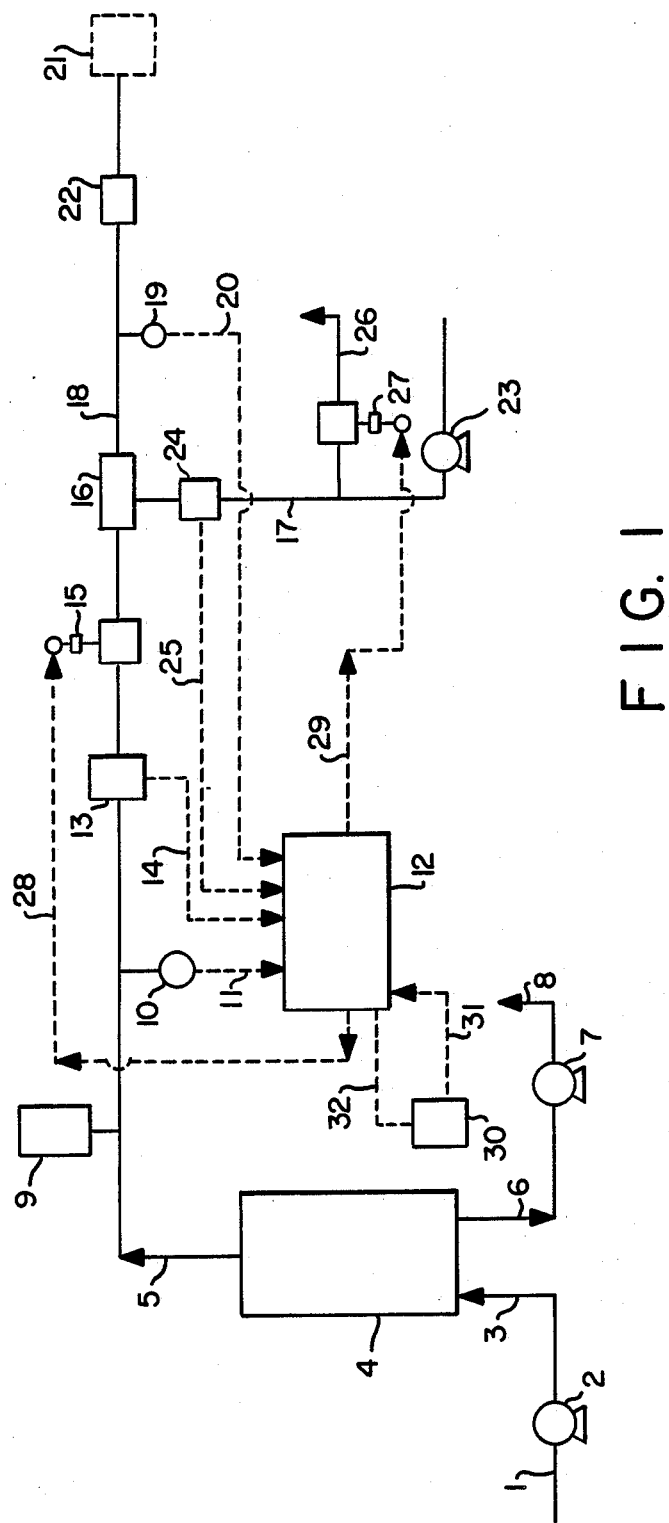
FIG. 1 is a process flow diagram illustrating the integration of a PSA system and air compression and blending means in a particular embodiment of the invention.

The objects of the invention are accomplished by utilizing a PSA and blending means to satisfy the requirements for oxygen enriched air for particular applications, generally such as to be above the production requirements most economically satisfied by the use of liquid oxygen and below the requirement levels at which an on site cryogenic plant is feasible.

In PSA processing, a feed gas mixture containing a more readily adsorbable component and a less readily adsorbable component are commonly passed to an adsorbent bed capable of selectively adsorbing the more readily adsorbable component at a higher adsorption pressure. The bed is thereafter depressurized to a lower desorption pressure for desorption of the more readily adsorbable component and its removal from the bed, prior to repressurization and the introduction of additional quantities of the feed gas mixture to the bed, as cyclic adsorption desorption operations are continued in the bed. Such PSA processing is commonly carried out in multi bed systems, with each bed employing the same PSA processing sequence on a cyclic basis interrelated to the carrying out of such processing sequence in the other beds of the adsorption system. In PSA systems for the separation of air, adsorbents can be employed that selectively adsorb nitrogen as the more readily adsorbable component, with oxygen being recovered as the less readily adsorbable component. Zeolitic molecular sieves, which operate on an equilibrium basis with a front of the selectively adsorbed nitrogen forming and advancing in the bed from the feed end to the product end thereof, are of this type and can be used in PSA processing cycles for the production of either oxygen or nitrogen as the desired product. In the latter case, an oxygen enriched air stream is also recovered. Those skilled in the art will appreciate that carbon molecular sieves, which operate on a rate selective basis not involving the formation and advance of such an adsorption front in the bed, are capable of selectively adsorbing oxygen, rather than nitrogen, and can also be used to produce high purity oxygen or an oxygen enriched air stream. The invention, in particular embodiments, can employ any such processing to obtain an oxygen containing stream suitable for blending with air to obtain an oxygen enriched air stream of desired oxygen concentration.

Using well known zeolitic molecular sieves, such as 5A and 13X material, typical PSA processing cycles for the production of high purity oxygen produce oxygen at purity levels of about 90-95%, while carbon molecular sieves have been used to achieve even higher purities, e.g. up to about 99.5%. In PSA processing cycles directed to the production of nitrogen as the desired product, oxygen containing streams having purity levels generally in the range of from about 30% to about 90%, typically from about 30% to about 50%, are recovered and can also be blended with air, in accordance with the invention, depending on the desired oxygen concentration in the product oxygen enriched air.

As indicated above, PSA systems operate between an upper adsorption pressure and a lower desorption pressure, which is typically atmospheric pressure or a subatmospheric pressure. While the upper adsorption pressure is typically above atmospheric, the upper adsorption pressure can also be at about atmospheric pressure in applications in which enriched oxygen streams are produced for blending with air as herein disclosed and claimed.

With reference to the accompanying drawing, a feed air stream in line 1 is passed to feed air compressor 2 for pressurization to the desired adsorption pressure level prior to passage in line 3 to PSA system 4 for separation of air into oxygen and nitrogen enriched streams. Said PSA system 4 can be any conventional or known PSA system, based on the use of zeolitic molecular sieves, carbon molecular sieves or any other adsorbent capable of selectively adsorbing either oxygen or nitrogen from the feed air to produce an oxygen enriched stream suitable for air blending to achieve the desired oxygen concentration.

It will be understood that PSA systems typically employ one or more adsorbent beds in the adsorption step, with feed gas passing to one or more beds at the upper adsorption pressure, while other beds in the system are being regenerated and repressurized. Such regeneration includes the desorption step in which the more selectively adsorbed component, either nitrogen or oxygen, is desorbed from the adsorbent material and withdrawn from the bed. In the illustrated embodiment of the drawing, oxygen is recovered as the less readily adsorbable component through line 5, while nitrogen as the more readily adsorbable component is withdrawn through line 6 under the action of vacuum compressor 7 for discharge from the system through line 8 as high purity nitrogen product, or as a nitrogen-enriched byproduct or as a waste stream.

The enriched oxygen stream in line 5, which optionally contains product surge tank 9, is subject to monitoring by conventional gas purity analyzer 10, which has a signal transmitter associated therewith and adapted to send an input signal, generally represented by the numeral 11 to process computer/controller 12. In said line 5, enriched oxygen also passes through product orifice 13, which monitors the flow of said oxygen enriched stream and which also has a conventional signal transmitter associated therewith and adapted to likewise send an output signal, generally represented by the numeral 14, to said process computer/controller 12. Downstream of said gas purity analyzer 10 and product orifice 13 in line 5, a process flow or flow limit control valve 15 is positioned for control of the enriched oxygen stream to mixing chamber 16, in which said oxygen enriched stream is mixed with air from line 17 to produce the desired oxygen enriched air product.

The blend of enriched oxygen from line 5 and air from line 17 are passed from mixing chamber 16 in outlet line 18, and is subject to monitoring by conventional gas purity analyzer 19, which has a signal transmitter associated therewith and adapted to send an input signal, generally represented by the numeral 20 to said process computer/controller 12. The blended oxygen enriched air in outlet line 18 is passed from the overall system of the invention to a downstream application, generally represented by the numeral 21. If desired, flow control valve means 22 can be employed in outlet line 18 to control the flow of oxygen enriched air from the PSA oxygen blending system of the invention to said downstream application 21.

The blend air in line 17 is received from blend air compressor 23 at the desired pressure for blending with the oxygen enriched gas stream in line 5. Prior to such blending in mixing chamber 16, the blend air in line 17 passes through blend air orifice 24, which monitors the flow of said blend air and which also has a conventional air flow signal transmitter associated therewith and adapted to likewise send an output signal, generally represented by the numeral 25, to said process computer/controller 12.

Between blend air compressor 23 and said blend air orifice 24, vent line 26 extends from line 17 so as to discharge to vent that portion of the blend air not required for blending with the enriched oxygen stream in mixing chamber 16. Vent line 26 contains blend mix control valve 27 for control of the amount of blend air diverted from line 17 to vent line 26. Alternately, compressor 23 can be modulated, as by speed control or guide vanes to vary the blend flow rate.

Process computer/controller 12 is programmed to send an output signal, represented by the numeral 28, to process flow control valve 15 and an output signal, represented by the numeral 29, to blend mix control valve 27. Those skilled in the art will appreciate that PSA system 4 will typically have cycle control means 30 for control of the operation of the PSA cycle in each bed of the system in proper operating sequence. In preferred embodiments of the invention, said control means 30 is adapted to send an output signal, generally represented by the numeral 31, to process computer/controller 12. In such embodiments, said process computer/controller 12 is programmed to send an output signal, represented by the numeral 32, to said PSA control means 30 for control of the operation of the PSA system 4 in response to fluctuations in the requirements of the overall system.

In operation, gas purity analyzer 10 is used to monitor the purity of the oxygen enriched stream in line 5 and to send a process variable input signal proportional to oxygen enriched gas purity to process computer/controller 12. Product orifice 13 is used to monitor the flow rate of said oxygen enriched stream in line 5 and to send a process variable input signal proportional to oxygen enriched gas flow to said process computer/controller 12. With this input information and the process variable input signal proportional to the oxygen concentration in line 18, as well as flow signal 25, process computer/controller 12 is adapted to send output signals to process flow control valve 15 in line 5 and to blend mix control valve 27 in blend air vent line 26. Thus, the amount of enriched oxygen from the PSA system and the amount of blend air from the blending system can be controlled and adjusted through process computer/controller 12 so that the oxygen enriched air stream, monitored by gas purity analyzer 19 in outlet line 18, can supply the desired total quantity of oxygen for the intended purpose at downstream application 21. Thus, by knowledge of the final oxygen enriched air purity and flow rate desired, the PSA and blending systems of the invention can be monitored and controlled so that the proper amount of air from the blending system is blended with the enriched oxygen stream from the PSA system to achieve the desired enriched oxygen product.

The system of the invention can be used to produce oxygen enriched air having a very wide range of desired oxygen concentrations, from as low as 22% to as high as about 90%, preferably from about 25% to about 70% oxygen by volume. While the invention can be employed on-site for the production of oxygen enriched air at any desired flow rate compatible with the efficient operation of PSA systems, the practice of the invention is particularly beneficial for the production of oxygen enriched air at the desired concentration in quantities of from about 5 to about 100, preferably from about 15 to about 60, tons of oxygen enriched air per day. As suggested above, larger quantities are typically best produced by the use of on-site cryogenic plants, while smaller quantities are advantageously supplied by the use of liquid oxygen shipped from a central, off site cryogenic air separation facility, for blending with air, or by membrane systems in certain quantity and purity ranges.

The PSA system used in the practice of the invention can supply oxygen enriched air for blending with air, as herein disclosed and claimed, over a wide range of desired pressures, depending on the requirements of the downstream, on site processing application to which the product oxygen enriched air is to be passed. Operating pressures are generally in the range of from about 0 to about 200, typically from about 5 to 100, more commonly 5–50 psig. A conventional 2 bed PSA system, operating with a processing cycle that includes vacuum deportion employing conventional zeolitic molecular sieve adsorbent material, can conveniently provide an oxygen enriched stream at an upper adsorption pressure of about 5 psig, which is suitable for blending with air at said pressure level to produce the desired product oxygen enriched air. Said product gas can be used for any downstream processing application requiring a particular oxygen concentration level that is readily achieved by the overall PSA air blending system of the invention. There are numerous applications throughout the combustion gas industry, e.g., in the steel industry, for such oxygen enriched air in the quantities economically and effectively furnished by the practice of the invention. The use of oxygen enriched air in place of ordinary air for combustion purposes is known to enable combustion furnaces to operate more efficiently and to reduce the power requirements associated with such industrial combustion operations. Those skilled in the art will appreciate that there are other applications for oxygen enriched air in which the production requirements are such that the PSA air blending system of the invention is an attractive alternative to the use of on-site cryogenic plants, liquid oxygen or membranes.

In the supply of oxygen enriched air by the supply of liquid oxygen to on site storage facilities and the blending of such oxygen with air, it will be appreciated that the liquid oxygen is supplied at an oxygen concentration of about 99.5%. In such circumstance, the combination of liquid storage and air blending system involves a relatively static blending operation in which a very high, fixed oxygen purity stream is mixed with a generally constant amount of air to provide the desired oxygen purity of a blended oxygen enriched air stream. Those skilled in the art will appreciate, on the other hand, that PSA system operation is of a more dynamic nature, subject to fluctuations and changes not pertaining in liquid oxygen-air blending systems. The ability to adjust the overall system, and the PSA system itself, to accommodate such dynamic operating conditions represents a highly advantageous feature, enhancing the overall feasibility to employing the invention with optimum efficiency in satisfying the needs for oxygen enriched air in commercially important applications. Thus, the preferred embodiments of the invention in which an input signal 31 is transmitted from PSA cycle control means 30 to process computer/controller 12, with an output signal 32 being returned to said control means 30, enables the PSA system to be monitored and controlled so that the PSA system and the air blending system can be efficiently interacted to supply the desired output of oxygen enriched air.

When the desired use of oxygen enriched air is at a pressure higher than the discharge pressure of the PSA system, then a booster compressor is required. The system of the invention can be simplified and made less costly if the functions of the blend blower and product booster compressor are combined, thus allowing for only one compression unit.

Figure 2:
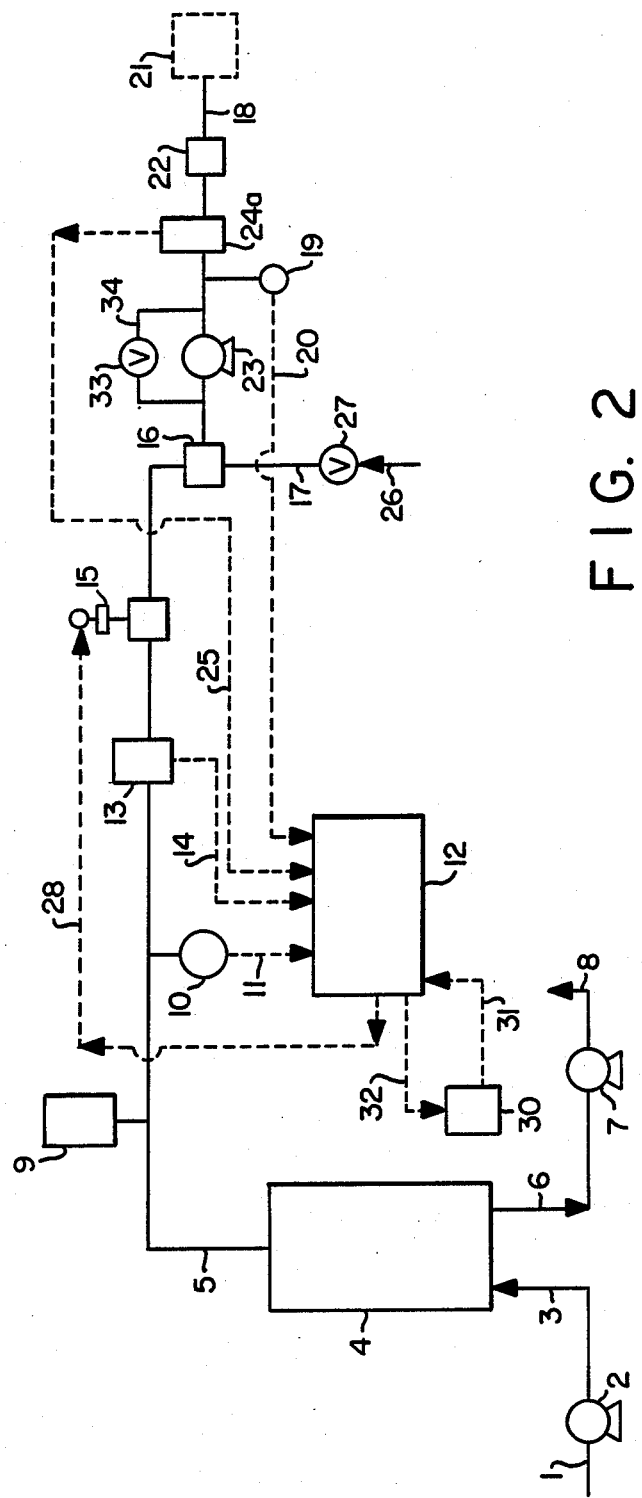
FIG. 2 is a process flow diagram illustrating a variation of the FIG. 1 embodiment in which single compression means are used both for adding blend air and for product booster compression.
Figure 3:
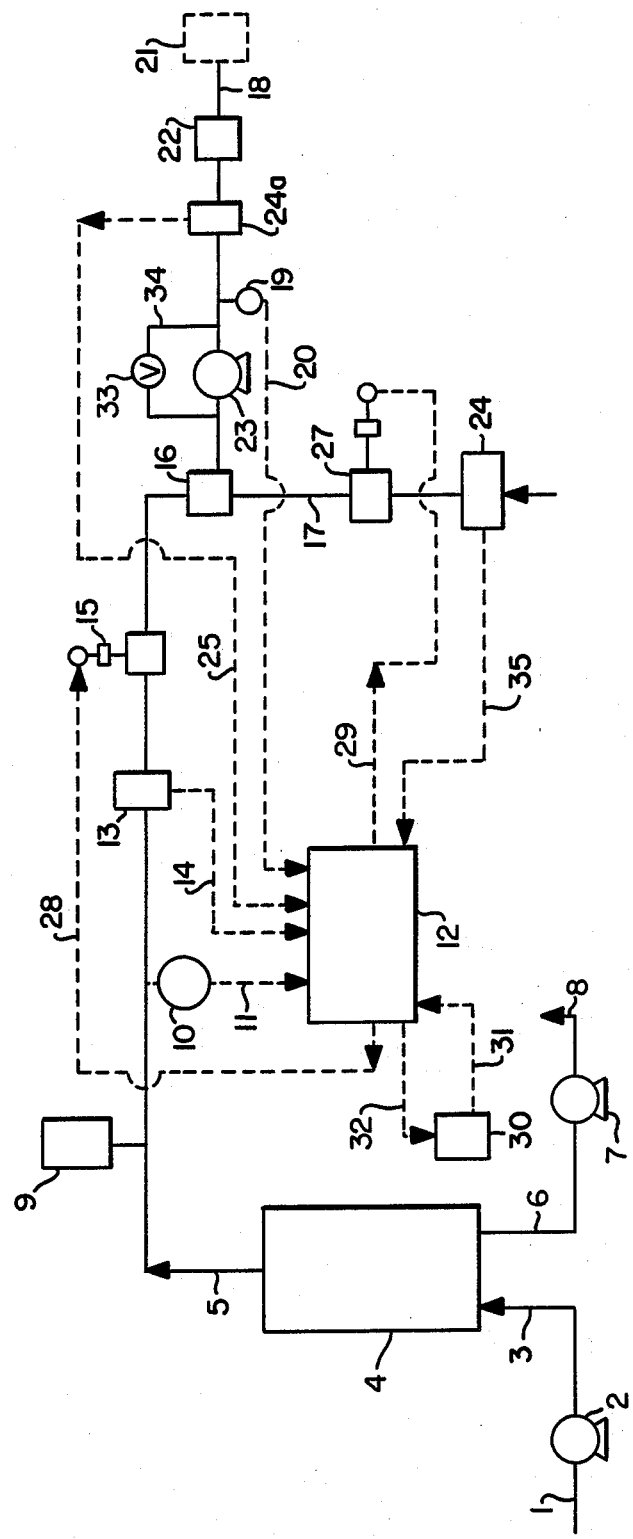
FIG. 3 is a process flow diagram illustrating a further variation of the FIG. 1 embodiment in which single compression means are used both for blend air addition and for product booster compression, with blend air line control.

FIGS. 2 and 3 show two alternate control schemes that could be used when using a booster compressor to both add blend air and boost the final oxygen enriched air stream to the required use pressure.

Referring to FIG. 2, PSA product gas and blend air are combined at the suction side of booster compressor 23. Total product flow is measured at product meter 24a, while PSA purity is monitored at analyzer 10. Knowing the blend air purity, PSA purity and final product flow and purity, the required PSA flow and blend air flow can be calculated in process computer/controller 12. This flow split is then controlled by sending signal 28 to PSA product valve 15, which adjusts PSA product flow, as monitored by product meter 13, to the required amount. Once PSA product flow is fixed, the blend air flow through conduit 26 becomes fixed. Blend air can enter conduit 26 via a fixed restriction, such as a check valve, pressure regulator or other such device 27.

Booster compressor 23 can be any type of compressor means used to compress gas suitable for enriched oxygen service, such as reciprocating compressors, centrifugal blowers or compressors, and the like. Booster compressor 23 can be capacity controlled in a number of ways, including monitoring discharge pressure or flow and sending a signal to a capacity control device such as a variable speed motor, a recycle valve, vent valve, unloader valves or the like, so that machine capacity matches demand use flow and pressure. In the FIG. 2 alternate, a back-pressure regulator 33 set at the downstream use pressure in a recycle line 34 around compressor 23 is used for capacity control.

Referring to the FIG. 3 variation, blend air flow can be monitored by product meter 24, adapted to send output signal 35 to computer/controller 12, and blend air flow controlled by valve 27 instead of the monitoring and control of PSA product flow at 13 & 15. As in the non-boosted embodiments of the invention, a number of possible control schemes can be used with various flows and/or purities monitored.

It will be understood that the FIG. 2 and 3 embodiments, preferred for higher pressure applications, are carried out in accordance with the FIG. 1 embodiment except as noted above.

Those skilled in the art will appreciate that various changes and modifications can be made in the details of the PSA air blending system as herein described, without departing from the scope of the invention as set forth in the appended claims. Thus, it will be understood that the PSA system can employ any number of adsorbent beds and can operate in accordance with any known cycle of sequential processing steps. The adsorbent materials can be selected from among any known adsorbents compatible with the particular type of adsorption mechanism desired, i.e., rate selective or equilibrium selective adsorption. The PSA system can also employ zeolitic molecular sieve adsorption to reach relatively high oxygen concentration levels, with carbon molecular sieves being used to achieve even higher oxygen purity levels prior to air blending.

The mechanical features of the system of the invention can likewise be modified from one application to another depending on the requirements of said application and the facilities available at a particular job site location. Oil flooded screw compressors can be employed for air compression purposes, but any other suitable oil lubricated or non oil lubricated air compression means can also be employed. It will be appreciated that a variety of capacity control devices, such as variable speed motors, internal recycle valves and suction valve unloaders can be used to turn down the air compression means in response to output signals from computer/controller 12, obviating the need for said vent control means referred to above. While orifice means were disclosed above as convenient means for determining gas flow in the PSA output line and in the air blending line, any other convenient, commercially available flow measurement means can be employed to determine the quantity of gas flowing in said lines and to transmit an input signal to the process computer/controller for the overall blending control purposes of the invention. Likewise, the enriched oxygen product flow control valve for control of the amount of enriched oxygen passed from the PSA system to the mixing chamber can be replaced by a conventional three way valve or other available flow control means capable of adjusting such gas flow in response to output signals from the process computer/controller. Those skilled in the art will also appreciate that the mixing chamber may be any convenient zone in which the oxygen enriched air from the PSA system and air from the blending system can be mixed for passage from the system as a blended oxygen enriched air product at the desired oxygen purity level and pressure. Auxiliary compression means can be employed, if required, to increase the pressure of the oxygen enriched stream from the PSA system to the desired product pressure level. Those skilled in the art will also appreciate that particular combustion systems may require different purity levels as a function of oxygen enriched air flow rates. This can, of course, be readily accommodated in the practice of the invention.

From the above, it will be understood that various technologies are available for the production of oxygen enriched air and for the supplying of such oxygen enriched air to downstream applications at a desired purity level. It will also be understood that each of said technologies is particularly beneficial for specific overall operating requirements. The invention provides a highly important advance in the art in enabling pressure swing adsorption technology to be efficiently and effectively used for such oxygen enriched air applications. By expanding the range of available alternatives to include the use of PSA systems in applications large enough so that liquid oxygen systems tend to be relatively expensive but too small for economic use of on-site cryogenic systems, the invention significantly contributes to the economic development of the use of oxygen enriched air for enhanced combustion applications of industrial importance.

We claim:

1. A system for the production of oxygen enriched air comprising:
    (a) a pressure swing adsorption system containing on or more adsorbent beds capable of selectively adsorbing either oxygen or nitrogen as the more readily adsorbable component of air, with separate recovery of the less readily adsorbable component and the more readily adsorbable component of air from said system;
    (b) means for passing feed air to said pressure swing adsorption system at a desired adsorption pressure;
    (c) enriched oxygen stream conduit means for passing either the less readily adsorbable component or the more readily adsorbable component of the feed air from the pressure swing adsorption system as an oxygen enriched stream at a desired pressure for subsequent blending with air;
    (d) air compression means for pressurizing blend air to said desired pressure for blending with said oxygen enriched stream;
    (e) blend air conduit means for passing said pressurized blend air from the air compression means for subsequent blending with said oxygen enriched stream;
    (f) a mixing zone for the mixing of said enriched oxygen stream and said blend air at a desired pressure to form a product oxygen enriched air stream;
    (g) discharge conduit means for passing said oxygen enriched air stream to a downstream application therefor;
    (h) vent conduit means for passing a portion of the pressurized blend air in said blend air conduit means to vent;
    (i) computer/controller means adapted to receive input signals corresponding to the flow rates of enriched oxygen in said enriched oxygen stream conduit means and of blend air in said blend air conduit means and to the oxygen purity in said enriched oxygen stream conduit means and in said discharge conduit means, and adapted to transmit output signals for the control of the flow rate of said oxygen enriched stream and said blend air stream so that said streams are blended to produce oxygen enriched air of the desired oxygen purity;
    (j) purity monitoring means for monitoring the purity of oxygen enriched stream in said enriched oxygen stream conduit means and of the product oxygen enriched air stream in said discharge conduit means, said monitoring means including transmitter means for sending input signals to said computer/controller means in response to said measured purities;

(k) flow monitoring means for monitoring the flow rate of said enriched oxygen stream in said enriched oxygen stream conduit means and of the blend air in said blend air conduit means upstream of the positioning of said vent conduit means, said monitoring means including transmitter means for sending input signals to said computer/controller means in response to said measured flow rates; and (l) flow control valve means in said enriched oxygen stream conduit means and in said vent conduit means for controlling the amount of enriched oxygen and blend air passed to the mixing zone, said flow control valve means being responsive to said output signals from said computer/controller means, whereby enriched oxygen from the pressure swing adsorption system and blend air can be properly blended to produce product oxygen enriched air having a desired oxygen concentration.

2. The system of claim 1 adapted for the production of product oxygen enriched air at the rate of from about 5 to about 100 tons/day.

3. The system of claim 2 in which said product production capacity is from about 15 to about 60 tons/day.

4. The system of claim 1 in which said flow monitoring means comprise flow orifices positioned in the lines being monitored.

5. The system of claim 1 in which said pressure swing adsorption system comprises two or more adsorbent beds.

6. The system of claim 5 in which said pressure swing adsorption system is operated with desorption at subatmospheric pressure level.

7. The system of claim 1 in which said product oxygen enriched air has an oxygen purity of from about 22% to about 99% by volume.

8. The system of claim 7 in which said oxygen product purity is from about 25% to about 95%.

9. The system of claim 1 in which said adsorbent beds are capable of selectively adsorbing nitrogen as the more readily adsorbable component of air.

10. A system for the production of oxygen enriched air comprising:

(a) a pressure swing adsorption system containing one or more adsorbent beds capable of selectively adsorbing either oxygen or nitrogen as the more readily adsorbable component of feed air passed to said system, with conduit means for recovering either the less readily adsorbable component or the more readily adsorbable component of the feed air as an oxygen enriched stream for subsequent blending with air at a desired pressure;

(b) air compression means for pressurizing blend air at said desired pressure for blending with said oxygen enriched stream, said air compression means including control means for controlling the flow rate of said blend air;

(c) a mixing zone for mixing said enriched oxygen stream and said blend air;

(d) discharge conduit means for passing oxygen enriched air product to a downstream application therefor;

(e) computer/controller means adapted to receive input signals corresponding to the flow rates of enriched oxygen and said blend air and to the oxygen purity of said enriched oxygen stream and said oxygen enriched air product and adapted to transmit output signals for the control of the flow rate of said oxygen enriched stream and said blend air so that the oxygen enriched air product is at the desired oxygen purity level;

(f) purity monitoring means for monitoring the purity of said oxygen enriched stream and of the oxygen enriched air product, and for transmitting input signals to said computer/controller means in response to said measured purities; and (g) flow monitoring means for monitoring the flow rate of said oxygen enriched stream and of said blend air passing into said mixing zone, and for transmitting input signals to said computer/controller means in response to said measured flow rates, whereby enriched oxygen from the pressure swing adsorption system and blend air can be properly blended to produce product oxygen enriched air having a desired oxygen concentration.

11. The system of claim 10 adapted for the production of product oxygen enriched air at the rate of from about 5 to about 100 tons/day.

12. The system of claim 11 in which said product production capacity is from about 15 to about 60 tons/day.

13. The system of claim 10 in which the pressure swing adsorption system comprises two or more adsorbent beds.

14. The system of claim 13 and including pressure swing adsorption control means adapted to send input signals to said computer/controller means corresponding to the operating conditions of said pressure swing adsorption system, said control means being adapted to receive output signals from said computer/controller means for modification of said operating conditions so that the performance of the pressure swing adsorption system can be adjusted so as to assure that said oxygen enriched stream is recovered from the pressure swing adsorption system at desired product flow and purity conditions.

15. The system of claim 10 in which said air compression means comprises an oil flood screw compressor.

16. The system of claim 10 in which said control means for controlling the flow rate of blend air comprises vent means for withdrawing a portion of the blend air being passed by said air compression means to said mixing zone.

17. The system of claim 16 in which said vent means includes flow control valve means responsive to output signals from the computer/controller means for controlling the portion of blend air discharged to the vent and the portion passed to said mixing zone.

18. The system of claim 10 and including capacity control means for turning down the output of said air compression means in response to output signals from said computer/controller means.

19. The system of claim 10 in which said oxygen product purity is from about 22% to about 90% by volume.

20. The system of claim 19 in which said oxygen product purity is from about 25% to about 50%.

21. The system of claim 10 in which said adsorbent beds are capable of selectively adsorbing nitrogen as the more readily adsorbable component of air.

* * * * *